(12) United States Patent
Li

(10) Patent No.: US 11,019,145 B2
(45) Date of Patent: May 25, 2021

(54) DATA SYNCHRONIZATION METHOD AND SYNCHRONIZATION SERVICE DEVICE

(71) Applicant: HUAWEI TECHNOLOGIES CO., LTD., Shenzhen (CN)

(72) Inventor: Xuefeng Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/959,328

(22) PCT Filed: Apr. 3, 2019

(86) PCT No.: PCT/CN2019/081163
§ 371 (c)(1),
(2) Date: Jun. 30, 2020

(87) PCT Pub. No.: WO2019/205906
PCT Pub. Date: Oct. 31, 2019

(65) Prior Publication Data
US 2021/0029198 A1 Jan. 28, 2021

(30) Foreign Application Priority Data
Apr. 28, 2018 (CN) .......................... 201810400515.9

(51) Int. Cl.
*H04L 29/08* (2006.01)
(52) U.S. Cl.
CPC ...... *H04L 67/1095* (2013.01); *H04L 67/2852* (2013.01)
(58) Field of Classification Search
CPC ................ H04L 67/1095; H04L 67/2852
See application file for complete search history.

(56) References Cited

U.S. PATENT DOCUMENTS

2014/0006354 A1\* 1/2014 Parkison ................. G06F 3/067
  707/649
2014/0149240 A1  5/2014 Ansel et al.
  (Continued)

FOREIGN PATENT DOCUMENTS

CN  102202044 A  9/2011
CN  103685367 A  3/2014
  (Continued)

OTHER PUBLICATIONS

"Restrictions on contacts, calendars, reminders, bookmarks, and maps," retrieved from: https://support.apple.com/zh-cn/HT202158 Aug. 19, 2020, Total 4 pages (Mar. 5, 2020). With English Abstract.

*Primary Examiner* — Benjamin M Thieu
(74) *Attorney, Agent, or Firm* — Leydig, Voit & Mayer, Ltd.

(57) ABSTRACT

Provided herein is a data synchronization method, to increase, without increasing cost of a data synchronization service, an amount of synchronization data stored on a server. The method includes: determining that there is target data that meets a specified condition in a first data set on a first server, where the first data set includes synchronization data of a terminal device; storing the target data into a second data set on a second server, and deleting the target data from the first data set. When a downlink data synchronization request sent by the terminal device is received, data in the first data set is used to synchronously update corresponding synchronization data on the terminal device, and data in the second data set is used to not synchronously update corresponding synchronization data on the terminal device.

11 Claims, 7 Drawing Sheets

(56) References Cited

U.S. PATENT DOCUMENTS

2014/0289200 A1   9/2014  Kato
2017/0364534 A1*  12/2017 Zhang ..................... G06N 5/04
2018/0359331 A1   12/2018 Jin et al.
2020/0344766 A1*  10/2020 Furuichi ............. H04W 72/082

FOREIGN PATENT DOCUMENTS

| CN | 104408064 A | 3/2015 |
| CN | 105488148 A | 4/2016 |
| CN | 105912703 A | 8/2016 |
| CN | 106850710 A | 6/2017 |
| CN | 107302549 A | 10/2017 |
| CN | 107623722 A | 1/2018 |

* cited by examiner

DATA SYNCHRONIZATION METHOD AND SYNCHRONIZATION SERVICE DEVICE

CROSS-REFERENCE TO RELATED APPLICATIONS

This application is a National Stage of International Application No. PCT/CN2019/081163, filed on Apr. 3, 2019, which claims priority to Chinese Patent Application No. 201810400515.9, filed on Apr. 28, 2018. Both of the aforementioned applications are hereby incorporated by reference in their entireties.

TECHNICAL FIELD

This application relates to the field of data transmission technologies, and in particular, to a data synchronization method and a synchronization service device.

BACKGROUND

With a wide application of a mobile terminal device, a user stores more data in the mobile terminal device, and the data become more important, for example, a calendar, a browser bookmark, and contacts. To prevent data loss and implement data sharing, a terminal device manufacturer provides a data synchronization service for a user by using a cloud server, so that data on a terminal device of the user is consistent with data stored on the cloud server. Further, when the user uses a plurality of terminal devices, data on each terminal device can be consistent, as shown in FIG. 1.

The cloud server maintains and manages synchronization data of the terminal device in the cloud, to implement real-time data synchronization between the terminal device and the cloud server. For example, the cloud server searches a plurality of pieces of synchronization data for specific data based on an uplink data synchronization request sent by the terminal device, and modifies or deletes the specific data. Therefore, more synchronization data maintained by the cloud server leads to higher cost of the data synchronization service. Currently, the terminal device manufacturer controls the cost of the data synchronization service by setting an upper limit of an amount of the synchronization data. For example, maximum quantities of contacts, calendars, memos, and bookmarks that are synchronized by each user are all limited to 20,000.

In a real world application, the user usually does not actively delete data (such as a memo) that is on the terminal device and that needs to be synchronized to the cloud server. Therefore, as time goes by, more data on the terminal device needs to be synchronized to the cloud server, and more synchronization data is stored in the cloud server. When the data stored in the cloud server reaches a set upper limit, the user needs to delete some data on the terminal device to reduce the synchronization data stored in the cloud server, so that the cloud server can continue to provide the data synchronization service for the user. However, if the user needs to use the deleted data, a problem that the deleted data cannot be obtained may occur. This brings inconvenience to the user and results in bad user experience.

SUMMARY

This application provides a data synchronization method and a synchronization service device, to increase, without increasing cost of a data synchronization service, an amount of synchronization data stored on a server.

According to a first aspect, this application provides a data synchronization method. The method may be applied to a chip in a synchronization service device, a synchronization service device, or the like. Using the synchronization service device as an example, the method includes: when determining that there is target data that meets a specified condition in a first data set on a first server, storing, by the synchronization service device, the target data into a second data set on a second server, and deleting the target data from the first data set. The first data set is used to store synchronization data of the terminal device. When a downlink data synchronization request sent by the terminal device is received, data in the first data set is used to synchronously update corresponding synchronization data on the terminal device, and data in the second data set is used to not synchronously update corresponding synchronization data on the terminal device.

According to the foregoing method, when determining that there is the target data that meets the specified condition in the first data set, the synchronization service device stores the target data into the second data set, and deletes the target data from the first data set, a data amount of the synchronization data of the terminal device stored in the first data set may be dynamically reduced, so that the first data set can continuously store the synchronization data of the terminal device.

In addition to storing the synchronization data of the terminal device in the first data set, the synchronization service device further dumps the target data that meets the specified condition into the second data set, so that the terminal device can obtain the synchronization data in the first data set by using the synchronization service device, and can further obtain historical data by using the second data set. Compared with the prior art in which the user deletes some synchronization data on the terminal device to reduce synchronization data stored on the synchronization service device, and continues to use a data synchronization service, the method can effectively improve user experience.

In an embodiment, the first server configured to store the first data set and the second server configured to store the second data set may be the same or may be different. The first server may be the synchronization service device, and the second server may also be the synchronization service device.

In an embodiment, the specified condition is any one or a combination of at least two of the following conditions:

condition 1: Storage duration of the data in the first data set is greater than a specified threshold;

condition 2: A storage time point of the data in the first data set is earlier than a first specified date;

condition 3: Time information included in the data in the first data set is earlier than a second specified date; and condition 4: The data in the first data set is not updated within specified duration.

According to the foregoing method, the synchronization service device may set different specified conditions to dump data that is stored in the first data set for relatively long time or data that does not need to be frequently accessed by the terminal device into the second data set. In this way, a data amount of the synchronization data of the terminal device in the first data set can be reduced, and the terminal device may store more synchronization data by using the synchronization service without deleting the synchronization data stored by the terminal device.

In an embodiment, the synchronization service device converts the target data into unstructured data, and stores the unstructured data obtained through conversion into the second data set.

According to the foregoing method, the synchronization service device dumps the target data into the second data set in a manner of the unstructured data, and there is no need to further manage or maintain the data (for example, update the data). This reduces cost of a data synchronization service.

In an embodiment, after the storing, by the synchronization service device, the target data into a second data set on a second server, the synchronization service device further obtains a storage address of the target data in the second data set; and creates and saves a dump record for the target data. The dump record includes an identifier of synchronization data of the terminal device corresponding to the target data and the storage address of the target data in the second data set.

According to the foregoing method, in a downlink data synchronization process, the synchronization service device may determine, based on the dump record, whether there is data requested by the terminal device in the second data set, and when determining that there is the data requested by the terminal device in the second data set, send, to the terminal device, a storage address corresponding to the data requested by the terminal device in the dump record.

In an embodiment, the dump record is structured data, in other words, the dump record is stored in a form of structured data, so that after receiving the downlink data synchronization request sent by the terminal device, the synchronization service device can quickly determine, based on the dump record, whether there is the data requested by the terminal device in the second data set, and the terminal device can quickly obtain the data requested by the terminal device in the second data set.

In an embodiment, the synchronization service device may further receive the downlink data synchronization request sent by the terminal device, where the downlink data synchronization request carries an identifier of synchronization data requested by the terminal device; determine, based on the dump record and the identifier of the synchronization data requested by the terminal device, that there is the synchronization data requested by the terminal device in the first data set and the second set; and send, to the terminal device, the data requested by the terminal device in the first data set and a storage address corresponding to the synchronization data requested by the terminal device in the dump record.

According to the foregoing method, after receiving the downlink data synchronization request sent by the terminal device, when determining that there is the synchronization data requested by the terminal device in the first data set and the second data set, the synchronization service device feeds back, to the terminal device, the synchronization data requested by the terminal device in the first data set and a storage address corresponding to the synchronization data requested by the terminal device in the second data set, so that the terminal device can quickly obtain the synchronization data requested by the terminal device in the first data set, and may further download, based on the received storage address, the synchronization data requested by the terminal device in the second data set, to obtain data that is stored for relatively long time or that is not frequently accessed. This effectively improves user experience.

In an embodiment, the synchronization service device may further receive a data query request sent by the terminal device, where the data query request carries an identifier of data to be queried by the terminal device; determine, based on the dump record and the identifier of the data to be queried by the terminal device, that there is the data to be queried by the terminal device in the second data set; and send, to the terminal device, a storage address corresponding to the data to be queried by the terminal device in the dump record.

According to the foregoing method, when the terminal device needs to access the data in the second data set, the synchronization service device may feed back, to the terminal device based on the data query request sent by the terminal device, the storage address corresponding to the data to be accessed by the terminal device, so that a user can view historical data stored on the terminal device.

In an embodiment, the synchronization service device may further receive the downlink data synchronization request sent by the terminal device, where the downlink data synchronization request carries an identifier of synchronization data requested by the terminal device; determine, based on the identifier of the synchronization data requested by the terminal device, that there is the synchronization data requested by the terminal device in the first set; and obtain, from the first data set, the synchronization data requested by the terminal device, and send the obtained data to the terminal device.

In an embodiment, before determining that there is the target data that meets the specified condition in the first data set, the synchronization service device may further receive an uplink data synchronization request sent by the terminal device, where the uplink data synchronization request carries the synchronization data of the terminal device and an operation corresponding to the synchronization data; and update the first data set based on the synchronization data and the operation corresponding to the synchronization data.

According to the foregoing method, when updating the first data set, the synchronization service device determines whether there is the target data in the first data set, and does not need to detect in real time whether there is the target data in the first data set. This can improve resource utilization of the synchronization service device and reduce resource waste.

According to a second aspect, this application further provides a synchronization service device. The synchronization service device has a function of implementing behavior of the synchronization service device in the method instance in the first aspect. The function may be implemented by hardware, or may be implemented by executing corresponding software. The hardware or software includes one or more modules corresponding to the foregoing functions.

In an embodiment, a structure of the synchronization service device includes a determining unit, a dumping unit, a creation unit, a transmission unit, and the like. These units may perform corresponding functions in the method example in the first aspect. For details, refer to detailed descriptions in the method example in the first aspect. Details are not described herein again.

In an embodiment, a structure of the synchronization service device includes components such as a processor, a memory, and a transceiver. The memory stores a software program that supports the synchronization service device in performing a corresponding function in the method in the first aspect. The memory is coupled to the processor, and stores program instructions and data necessary for the synchronization service device.

According to a third aspect, an embodiment of this application further provides a computer storage medium.

The storage medium stores a software program. When being read and executed by one or more processors, the software program can implement the method provided herein.

According to a fourth aspect, an embodiment of this application further provides a computer program product. When being read and executed by one or more processors, the computer program product can implement the method provided herein.

DESCRIPTION OF EMBODIMENTS

Figure 1:
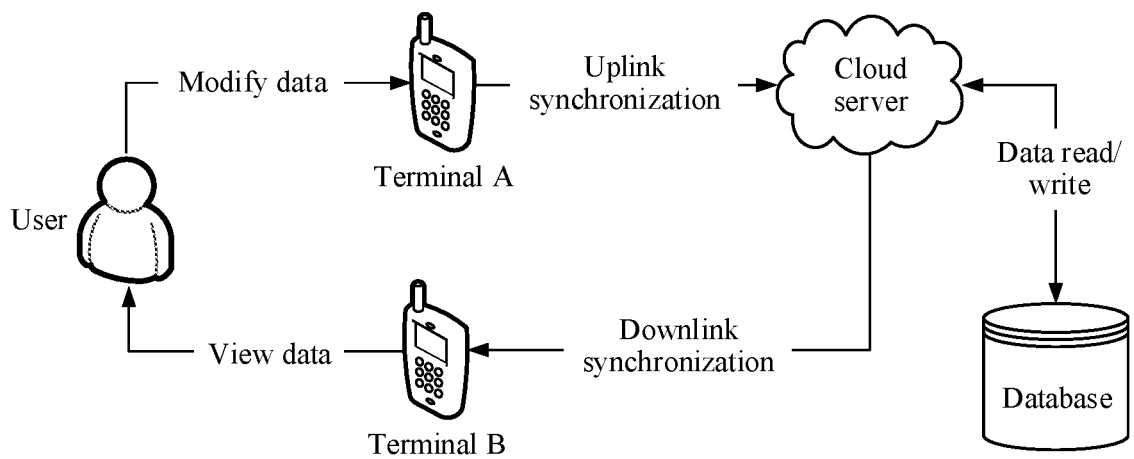
FIG. 1 is a schematic flowchart of data synchronization in the prior art.

This application provides a data synchronization method and a synchronization service device, to increase, without increasing cost of a data synchronization service, an amount of synchronization data stored on a server. The method and the synchronization service device in this application are based on a same inventive concept. Because problem-resolving principles of the method and the synchronization service device are similar, mutual reference may be made between an embodiment of the synchronization service device and an embodiment of the method, and no repeated description is provided.

In the following, some terms in this application are described, so as to help persons skilled in the art have a better understanding.

(1) Structured data (structured data), also referred to as row data, is logically expressed and implemented by a two-dimensional table structure. It strictly complies with a data format and length specifications and is stored and managed by using a relational database.

For example, the following table is a first data set corresponding to a schedule event synchronized by a terminal device to a cloud server, and a row in the table represents one piece of structured data.

| Event ID (eventID) | Event (eventcontent) | Event Time (eventTime) |
|---|---|---|
| 9532 | Hold a meeting | Sep. 1, 2017 |
| 9531 | Attend a class reunion | Aug. 27, 2017 |
| ... | ... | ... |
| 4533 | Do a workout | 2017 Aug. 23 |
| 4532 | Deliver a product version | 2017 Jul. 30 |

-continued

| Event ID (eventID) | Event (eventcontent) | Event Time (eventTime) |
|---|---|---|
| ... | ... | ... |
| 4421 | Attend a charity meeting | 2017 May 23 |
| ... | ... | ... |
| 0001 | Have a meeting | 2016 Dec. 16 |

(2) Unstructured data: is data whose data structure is irregular or incomplete and has no predefined data model. It is inconvenient to represent the data by using a two-dimensional logical table of a database. The unstructured data includes office documents (such as Word and Excel) in various formats, texts, images, extensible markup language (XML) format files, hypertext markup language (HTML) format files, and javascript object notation (JSON) format files, various audio/video files, and the like.

(3) And/or: describes an association relationship between associated objects, and indicates that three relationships may exist. For example, A and/or B may represent the following cases: Only A exists, both A and B exist, and only B exists. The character "/" generally indicates an "or" relationship between the associated objects.

In addition, it should be understood that in descriptions of this application, terms such as "first" and "second" are merely used for differentiation and description, but should not be understood as an indication or implication of relative importance or an indication or implication of an order.

This application provides a data synchronization method. The method may be applied to a chip in a synchronization service device, a synchronization service device, or the like, and is particularly applicable to a cloud synchronization service device. The synchronization service device may be a control server (or a synchronization server), and the control server can manage and control a first server and a second server, for example, a control server in a cloud server cluster system. Alternatively, the synchronization service device may be a first integration server, and the first server and the second server are integrated into the first integration server. Alternatively, the synchronization service device may be a second integration server, the first server is integrated into the second integration server, and the second integration server can manage and control the second server. Alternatively, the synchronization service device may be a third integration server, the second server is integrated into the third integration server, and the third integration server can manage and control the first server.

Figure 2:
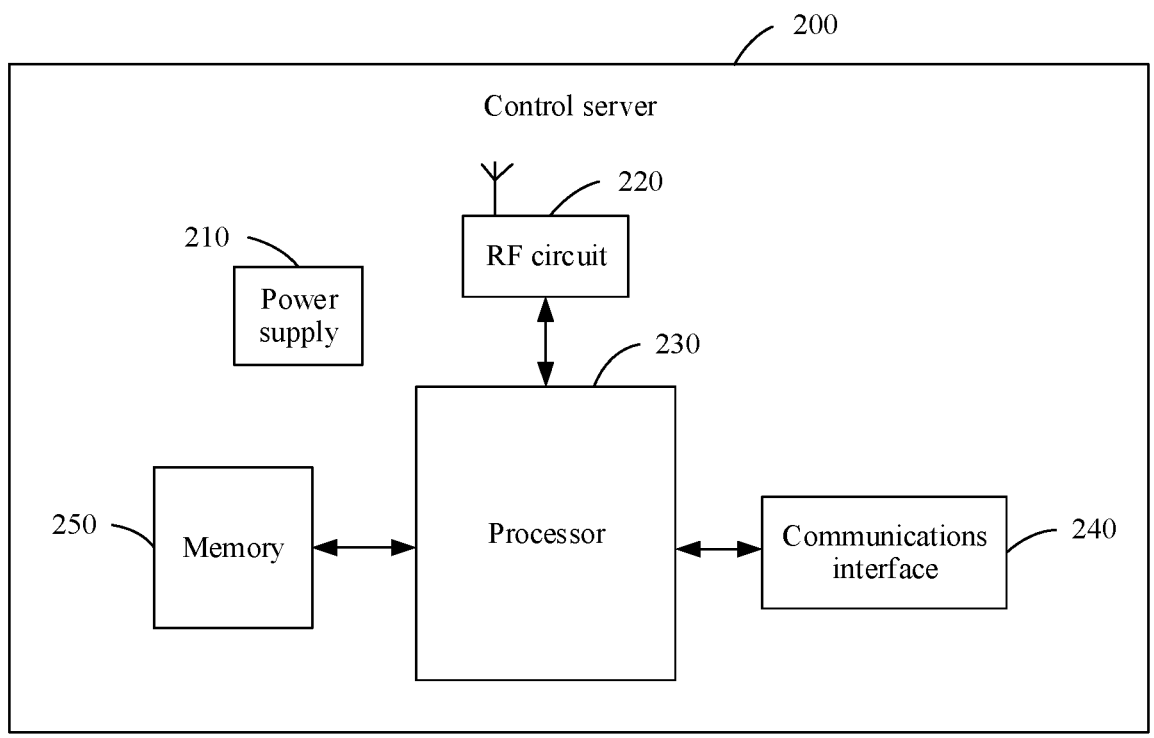
FIG. 2 is a schematic structural diagram of a server according to an embodiment of this application.

FIG. 2 shows a possible structure of a control server. The control server 200 includes components such as a power supply 210, a radio frequency (RF) circuit 220, a processor 230, a communications interface 240, and a memory 250. A person skilled in the art may understand that the structure of the control server in FIG. 2 does not constitute a limitation on the control server. The control server provided in this embodiment of this application may include more or fewer components than those in FIG. 2, may include a combination of some components, or have different component arrangements.

The following describes each component of the control server 200 in detail with reference to FIG. 2.

The power supply 210 is configured to supply power to each component in the control server 200. Optionally, the power supply 210 may be logically connected to the processor 230 by using a power management system, so that the power management system implements functions such as charging and discharging management and power consumption management.

The RF circuit 220 may be configured to receive and send to-be-synchronized data in a data synchronization process. After receiving uplink data sent by a terminal device, the RF circuit 220 sends the uplink data to the processor 230 for processing, and sends to-be-sent downlink data to the terminal device. The RF circuit 220 usually includes but is not limited to an antenna, at least one amplifier, a transceiver, a coupler, a low noise amplifier (LNA), a duplexer, and the like.

In addition, the RF circuit 220 may further communicate with a network and another device through wireless communication. Any communications standard or protocol may be used for the radio communications, including but not limited to a global system for mobile communications (GSM), a general packet radio service (GPRS), code division multiple access (CDMA), wideband code division multiple access (WCDMA), long term evolution (LTE), an email, a short message service (SMS), and the like.

The control server 200 may be physically connected to another device by using the communications interface 240. Optionally, the communications interface 240 is connected to a communications interface of the another device by using a cable, to implement data transmission between the control server 200 and the another device, or implement management and maintenance of the server by an administrator.

The memory 250 may be configured to store a software program and a module. The processor 250 executes various functional applications of the control server 200 and data processing by running a software program and a module that are stored in the memory 250.

Optionally, the memory 250 may mainly include a program storage area and a data storage area. The program storage area may store an operating system, various application programs (for example, a data synchronization application), and the like. The data storage area may store synchronization data (such as a browser bookmark, contacts, and a memo) sent by the terminal device.

In addition, the memory 250 may include a high-speed random-access memory, and may further include a nonvolatile memory, for example, at least one magnetic disk storage device, a flash memory device, or another volatile solid-state storage device.

The processor 230 is a control center of the control server 200, and is connected to components by using various interfaces and cables. The processor 230 performs various functions of the control server 200 and processes data by running or executing a software program and/or a module stored in the memory 250 and invoking data stored in the memory 250. In this way, a plurality of services based on the server are implemented, for example, a data synchronization service. The processor 230 may include one or more processing units.

Figure 3:
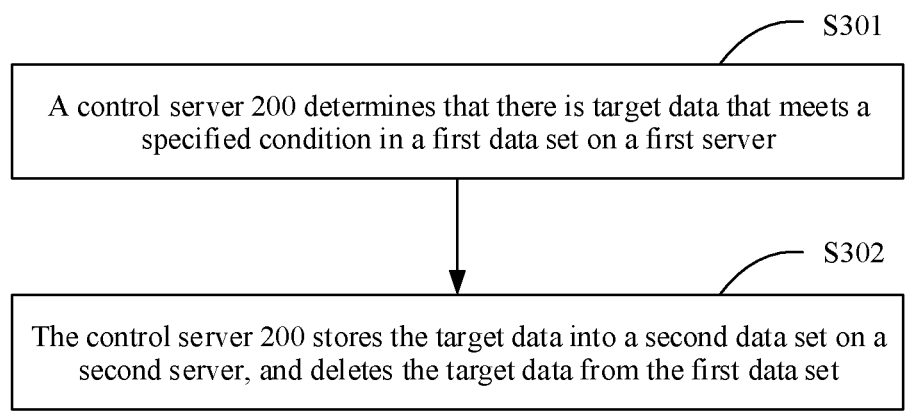
FIG. 3 is a schematic flowchart of a data synchronization method according to an embodiment of this application.

An embodiment of this application provides a data synchronization method. The method may be applied to the control server 200 in FIG. 2. Therefore, in this embodiment of this application, only an example in which the synchronization service device is the control server 200 is used for description, and does not constitute a limitation on the synchronization service device. Referring to FIG. 3, an exemplary procedure of the method includes the following steps.

S301. The control server 200 determines that there is target data that meets a specified condition in a first data set on a first server. The first data set is used to store synchronization data of a terminal device.

The first server and the second server may be the same or may be different. When the first server and the second server are a same server, the first data set and the second data set are stored in different storage areas of the server.

Optionally, the control server 200 determines, by performing the following step, that there is the target data that meets the specified condition in the first data set: The control server 200 queries, by using the processor 230, the first data set stored on the first server, and determines, based on the specified condition, that there is the target data in the first data set.

In an embodiment, the control server 200 stores, in a database in a form of structured data based on a user account to which each terminal device belongs and a data type of synchronization data sent by each terminal device, the synchronization data sent by each terminal device. In this case, a table that is in the database and that is used to store the synchronization data of the terminal device is equivalent to one first data set. For different data types of synchronization data in a same user account, the control server 200 may store the different data types of synchronization data in different databases, or may store the different data types of data in different tables of a same database.

In an embodiment, the specified condition includes but is not limited to any one or a combination of a plurality of the following conditions:

A. Storage duration of data in the first data set is greater than a specified threshold. For example, the storage duration of the data in the first data set is greater than three months.

B. A storage time point of the data in the first data set is earlier than a first specified date. For example, the storage time point of the data in the first data set is earlier than Jun. 1, 2015.

C. Time information included in the data in the first data set is earlier than a second specified date. For example, the synchronization data of the terminal device in the first data set is memo data, the memo data includes data corresponding to N events, occurrence time of an event 1 is Mar. 1, 2017, occurrence time of an event 2 is Jun. 1, 2017, . . . , and occurrence time of an event N is Apr. 6, 2017. The occurrence time of each event is time information included in data corresponding to the event. In this case, the specified condition may be that the occurrence time of the event is earlier than May 2017.

Optionally, each piece of data in the first data set may be numbered based on a sequence in which the data is stored in the first data set. For example, a sequence number of a first piece of structured data stored in the first data set is 1, a sequence number of a second piece of structured data stored in the first data set is 2, and so on, a sequence number of an $N^{th}$ piece of structured data stored in the first data set is N.

Alternatively, the data in the first data set may be numbered based on a sequence of the time information included in the data. For example, the synchronization data of the terminal device in the first data set is the memo data, and the memo data includes data corresponding to three events, if occurrence time of an event 1 is Mar. 1, 2017, occurrence time of an event 2 is Jun. 1, 2017, and occurrence time of an event 3 is Apr. 6, 2017, a number of data corresponding to the event 1 in the first data set is 1, a number of data corresponding to the event 3 in the first data set is 2, a number of data corresponding to the event 2 in the first data set is 3, and so on.

In a scenario in which the data in the first data set is numbered in the foregoing two manners, the specified condition may alternatively be that a number of the data in the first data set is less than a specified value.

D. The data in the first data set is not updated within specified duration.

According to the foregoing method, the control server 200 may dump historical data that is stored in the first data set for relatively long time or data that is not frequently used into the second data set. In this way, a data amount of the synchronization data of the terminal device in the first data set can be reduced, so that the terminal device can store more synchronization data in the first data set without deleting the synchronization data stored on the terminal device.

In an embodiment, a manner in which the control server 200 detects whether there is the target data in the first data set includes but is not limited to the following plurality of manners:

Manner 1: The control server 200 may periodically detect whether there is the target data in the first data set. Particularly, the control server 200 may periodically detect, in an idle time period of the control server 200, whether there is the target data in the first data set, to reduce impact of detecting whether there is the target data in the first data set on another service in the control server 200, and to improve resource utilization of the server.

Optionally, the control server 200 may periodically detect whether there is the target data in the first data set by using the following steps: A timer is set on the processor 230 of the control server 200, and when a time point of the timer arrives, the processor 230 queries the first data set on the first server, and determines, based on the specified condition, whether there is the target data in the first data set.

Manner 2: After the control server 200 updates the first data set based on an uplink data synchronization request sent by the terminal device, the control server 200 may detect whether there is the target data in the first data set.

That the control server 200 updates the first data set based on the uplink data synchronization request sent by the terminal device includes the following step: The control server 200 receives the uplink data synchronization request sent by the terminal device, where the uplink data synchronization request carries the synchronization data of the terminal and an operation corresponding to the synchronization data, and the control server 200 updates the first data set based on the synchronization data and the operation corresponding to the synchronization data. The operation corresponding to the synchronization data includes deletion, modification, and addition.

Optionally, the control server 200 updates the first data set by using the following steps: The control server 200 receives, by using a RF circuit 220, the uplink data synchronization request sent by the terminal, and sends the uplink data synchronization request to the processor 230; and after receiving the uplink data synchronization request, the processor 230 updates the first data set on the first server based on the synchronization data of the terminal in the uplink data synchronization request and the operation corresponding to the synchronization data.

It should be noted that an occasion for sending the uplink data synchronization request by the terminal device is not limited in this embodiment of this application. For example, the terminal device may send the uplink data synchronization request when determining that data of a specified application (such as a calendar application, a memo application, or a contacts application) changes; alternatively, the terminal device may send the uplink data synchronization request when it is determined that a synchronization function on the terminal device is enabled.

In a multi-terminal synchronization scenario, in other words, at least two terminal devices perform data synchronization through a same user account on the control server 200, after any one of the two terminal devices sends the uplink data synchronization request to the control server 200 to update the synchronization data in the first data set, the control server 200 further needs to send updated synchronization data of the any one terminal device to the other terminal device in the two terminal devices, so that data on the at least two terminal devices is consistent.

Manner 3: After receiving a data detection request sent by the terminal device, the control server 200 detects whether there is the target data in the first data set.

The control server 200 receives, by using the RF circuit 220, the data detection request sent by the terminal device, and sends the data detection request to the processor 230. After receiving the data detection request, the processor 230 queries the first data set in the memory 250, and determines, based on the specified condition, whether there is the target data in the first data set.

S302. The control server 200 stores the target data into the second data set on the second server, and deletes the target data from the first data set.

When a downlink data synchronization request sent by the terminal device is received, data in the first data set is used to synchronously update corresponding synchronization data on the terminal device, and data in the second data set is used to not synchronously update corresponding synchronization data on the terminal device.

The processor 230 in the control server 200 obtains the target data from the first data set on the first server, and sends the target data to the second server by using the RF circuit 220, so that the second server stores the target data into the second data set.

In an embodiment, the control server 200 converts the target data into unstructured data, and stores the unstructured data obtained through conversion into the second data set, so that the control server 200 may not need to further manage or maintain the data (for example, update the data). This can reduce cost of a data synchronization service. The control server 200 may convert the target data into the unstructured data by using the processor 230, and store the unstructured data obtained through conversion into the second data set.

In an embodiment, to avoid resource waste caused by a relatively small amount of the target data that needs to be converted by the control server 200 each time, the control server 200 may convert the target data into the unstructured data when the amount of the target data is greater than a specified lower threshold.

It should be noted that a specific format of the unstructured data obtained after the target data is converted is not limited in this embodiment of this application. The format of the unstructured data may be an XML format, a JSON format, an HTML format, or the like.

In an embodiment, after storing the target data into the second data set, the control server 200 may further obtain a storage address of the target data in the second data set, and create and store a dump record for the target data. The dump record includes an identifier of the synchronization data of the terminal device corresponding to the target data and the storage address of the target data in the second data set, so that the control server 200 may determine, based on the dump record in a downlink data synchronization process, whether there is the data requested by the terminal device in the second data set, and when determining that there is the data requested by the terminal device in the second data set, sends the storage address corresponding to the data requested by the terminal device in the dump record to the terminal device.

If the second server is the control server 200, the control server 200 generates the storage address of the target data. If the second server is not the control server 200, the second server generates the storage address of the target data, and sends the storage address of the target data to the control server 200. The dump record may be stored in the control server 200 or the first server. The control server 200 may create the dump record by using the processor 230, and stores the dump record in the memory 250 or in the first server.

In some embodiments, the dump record is structured data, in other words, the dump record is stored in a form of the structured data, so that after receiving the downlink data synchronization request sent by the terminal device, the control server 200 can quickly determine whether there is the data requested by the terminal device in the second data set, and the terminal device can quickly obtain the data requested by the terminal device in the second data set.

In an embodiment, after converting the target data into the unstructured data and storing the unstructured data obtained through conversion into the second data set, the control server 200 may further obtain an identifier of the unstructured data obtained through conversion from the second data set, create and store a dump record of the target data. The dump record includes an identifier of synchronization data of the terminal device corresponding to the target data and an identifier of the unstructured data corresponding to the target data in the second data set. The identifier of the unstructured data is a unique identifier of the target data in the second data set, so that in a downlink data synchronization process, the control server 200 may determine, based on the dump record, whether there is data requested by the terminal device in the second data set, and when determining that there is the data requested by the terminal device in the second data set, sends an identifier of unstructured data corresponding to the data requested by the terminal device in the dump record to the terminal device, so that the terminal device obtains corresponding data from the second data set by using the obtained identifier of the unstructured data.

Optionally, in a scenario in which the control server 200 creates and stores the dump record, the control server 200 performs downlink data synchronization in the following two manners:

Manner 1:

i. The control server 200 receives a downlink data synchronization request sent by the terminal device, where the downlink data synchronization request carries an identifier of synchronization data requested by the terminal device.

The control server 200 may receive the downlink data synchronization request by using the RF circuit 220, and the RF circuit 220 sends the downlink data synchronization request to the processor 230 for processing.

ii. The control server 200 determines, based on the dump record and the identifier of the synchronization data requested by the terminal device, that there is the synchronization data requested by the terminal device in the first data set and the second set.

The control server 200 may query the first data set and the second data set by using the processor 230, to determine that there is the synchronization data requested by the terminal device in the first data set and the second data set.

iii. The control server 200 sends, to the terminal device, the data requested by the terminal device in the first data set and a storage address corresponding to the synchronization data requested by the terminal device in the dump record, so that the terminal may download, based on the received storage address, the synchronization data requested by the terminal device in the second data set.

The control server 200 may obtain, from the first data set by using the processor 230, the synchronization data requested by the terminal device, obtain, from the dump record, the storage address corresponding to the synchronization data requested by the terminal device, and send, to the terminal device by using the RF circuit 220, the obtained synchronization data requested by the terminal device in the first data set and the storage address corresponding to the synchronization data requested by the terminal device in the dump record.

In the foregoing downlink data synchronization manner, the terminal device can quickly obtain the synchronization data requested by the terminal device in the first data set, and may further download, based on the received storage address, the synchronization data requested by the terminal device in the second data set, to obtain data that is stored for relatively long time or that is not frequently accessed. This effectively improves user experience.

Manner 2: i. The control server 200 receives a data query request sent by a terminal device, where the data query request carries an identifier of data to be queried by the terminal device.

The control server 200 may receive the data query request by using the RF circuit 220, and the RF circuit 220 sends the data query request to the processor 230 for processing.

ii. The control server 200 determines, based on the dump record and the identifier of the data to be queried by the terminal device, that there is the data to be queried by the terminal device in the second data set.

The control server 200 may query the dump record by using the processor 230, and determines that there is the data to be queried by the terminal device in the second data set.

iii. The control server 200 sends, to the terminal device, a storage address corresponding to the data to be queried by the terminal device in the dump record.

The control server 200 may obtain, from the dump record by using the processor 230, the storage address corresponding to the data queried by the terminal device, and send, to the terminal device by using the RF circuit 220, the obtained storage address corresponding to the data queried by the terminal device in the dump record.

In the foregoing downlink data synchronization manner, when the terminal device needs to access the data in the second data set, the control server 200 may feed back, to the terminal device based on the data query request sent by the terminal device, the storage address corresponding to the data to be accessed by the terminal device, so that a user can view historical data stored on the terminal device.

Optionally, the control server 200 may further receive the downlink data synchronization request sent by the terminal device, where the downlink data synchronization request carries an identifier of synchronization data requested by the terminal device; determine, based on the identifier of the synchronization data requested by the terminal device, that there is the synchronization data requested by the terminal device in the first set; and obtain, from the first data set, the synchronization data requested by the terminal device, and send the obtained data to the terminal device.

For a step of receiving, by the control server 200, the downlink data synchronization request, a step of determining that there is the synchronization data requested by the terminal device in the first set, and a step of obtaining the synchronization data requested by the terminal device from the first data set, and sending the obtained data to the terminal device, refer to related descriptions in Manner 1. Details are not described herein again.

According to the foregoing data synchronization method, when determining that there is the target data that meets the specified condition in the first data set, the control server 200 converts the target data into the second data set, and deletes the target data from the first data set. The first data set is used to store the synchronization data of the terminal device. When the downlink data synchronization request sent by the terminal device is received, the data in the first data set is used to synchronously update the corresponding synchronization data on the terminal device, and the data in the second data set is used to not synchronously update the corresponding synchronization data on the terminal device. In other words, in this embodiment of this application, the control server 200 that provides the data synchronization service can dump, into the second data set, the target data that meets the specified condition in the first data set, so that a data amount of the synchronization data of the terminal device stored in the first data set can be dynamically reduced, and the first data set can continuously store the synchronization data of the terminal device, and does not exceed a specified upper limit of a storage capacity. In addition, the control server 200 stores the target data into the second data set, so that the terminal device can quickly obtain the synchronization data in the first data set by using the control server 200, and can also obtain the data in the second data set by using the control server 200, so that the user can view, by using the terminal device, the historical data that is stored in the second data set for relatively long time or that is not frequently used, and does not need to delete the synchronization data. Compared with the prior art, the method can effectively improve user experience of the data synchronization service.

The following describes in detail an example of the data synchronization method provided in this application, wherein a data synchronization process is triggered when a user operates a calendar application in a terminal device. The synchronization service device is a control server (or a synchronization server). A database in the first server is used to store the first data set, the first data set is used to store calendar data of the terminal device, and the second server is a file storage server and is used to store the second data set.

Figure 4:
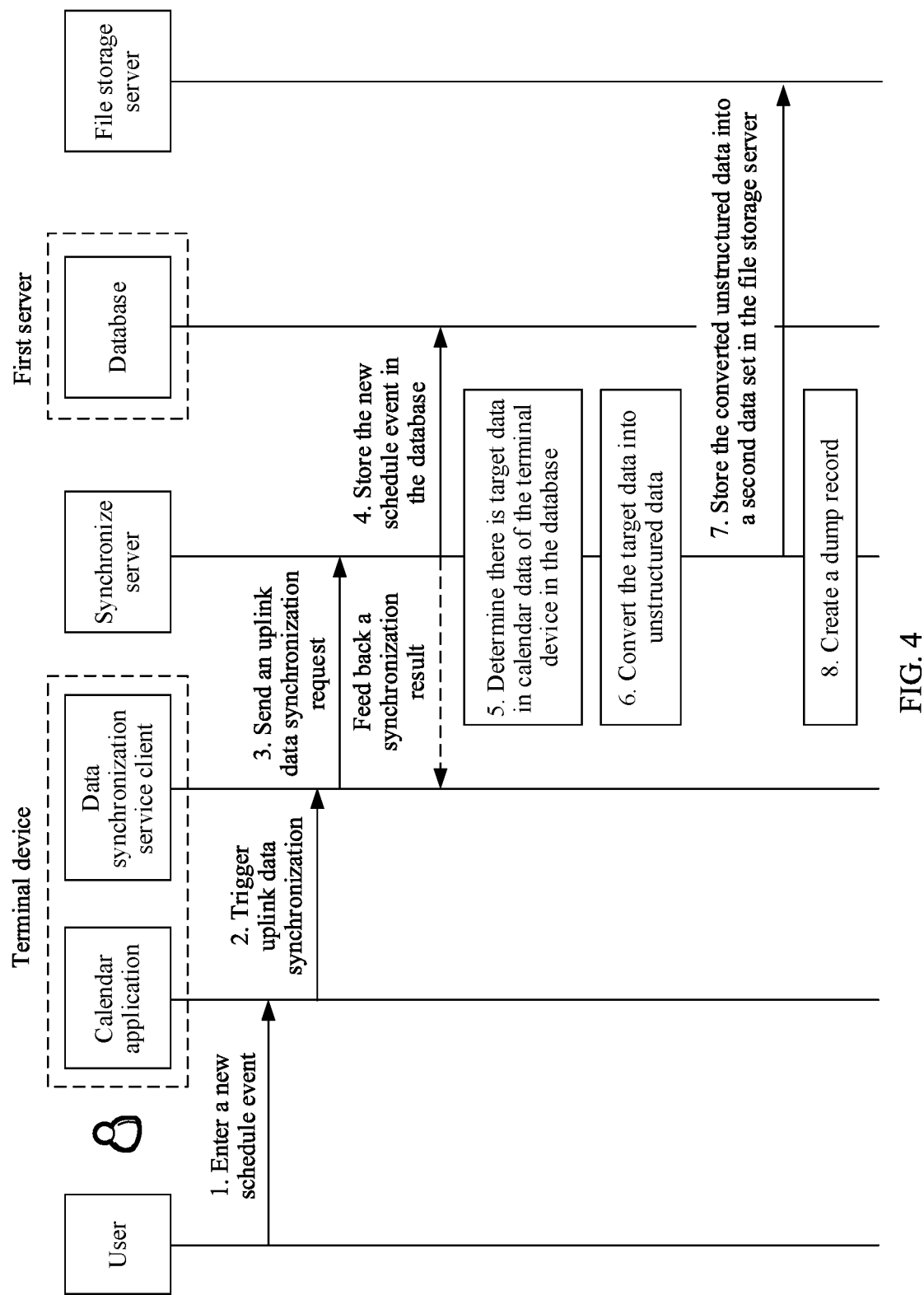
FIG. 4 is a schematic flowchart of an uplink data synchronization process according to an embodiment of this application.

Embodiment 1: when a user inputs a new schedule event by using a calendar application on the terminal device, an uplink data synchronization process is triggered. As shown in FIG. 4, the process includes the following steps:

1. A user enters a new schedule event by using a calendar application in a terminal device.

2. The calendar application triggers a data synchronization service client on the terminal device, to perform uplink data synchronization.

3. The data synchronization service client on the terminal device sends an uplink data synchronization request to the control server. The uplink data synchronization request carries the new schedule event entered by the user, a data type (calendar data) corresponding to the new schedule event, and an operation (add) corresponding to the new schedule event.

4. The control server stores the new schedule event in a database of the server in a form of structured data based on the uplink data synchronization request.

During implementation, after storing the new schedule event in the database in the form of structured data, the control server may further feed back a synchronization result of the new schedule event to the data synchronization service client on the terminal device, to notify the terminal device whether the new schedule event is successfully synchronized.

5. The control server detects calendar data that corresponds to a user account to which the terminal device belongs and that is stored in the database, and determines that there is target data, whose time information included in the target data is earlier than a second specified date, in the calendar data corresponding to the user account to which the terminal device belongs.

6. The control server converts the target data into unstructured data.

Figure 5:
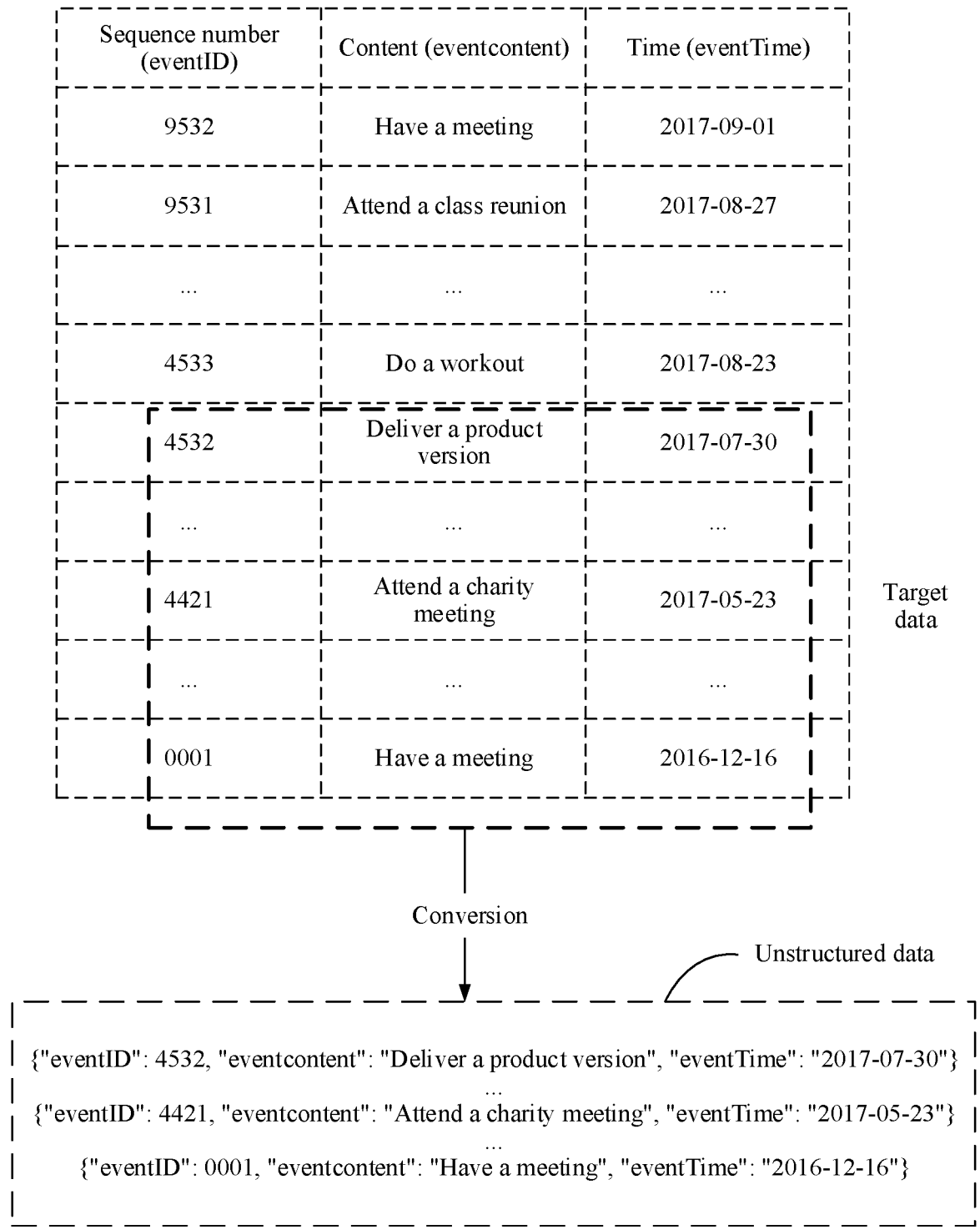
FIG. 5 is a schematic flowchart of converting target data into unstructured data according to an embodiment of this application.

For example, as shown in FIG. 5, if the second specified date is August 2017, the control server determines, as target data, calendar data whose time information included the calendar data in the first data set is earlier than August 2017, and converts the determined target data into the unstructured data.

7. The control server stores the unstructured data obtained through conversion into the second data set in the file server.

During implementation, after storing the unstructured data obtained through conversion into the second data set, the file server may further feed back a storage result and a storage address of the unstructured data obtained through conversion to the control server.

8. The control server creates a dump record. The dump record includes an identifier of synchronization data of the terminal device corresponding to the unstructured data obtained through conversion and the storage address of the unstructured data obtained through conversion.

Figure 6A:
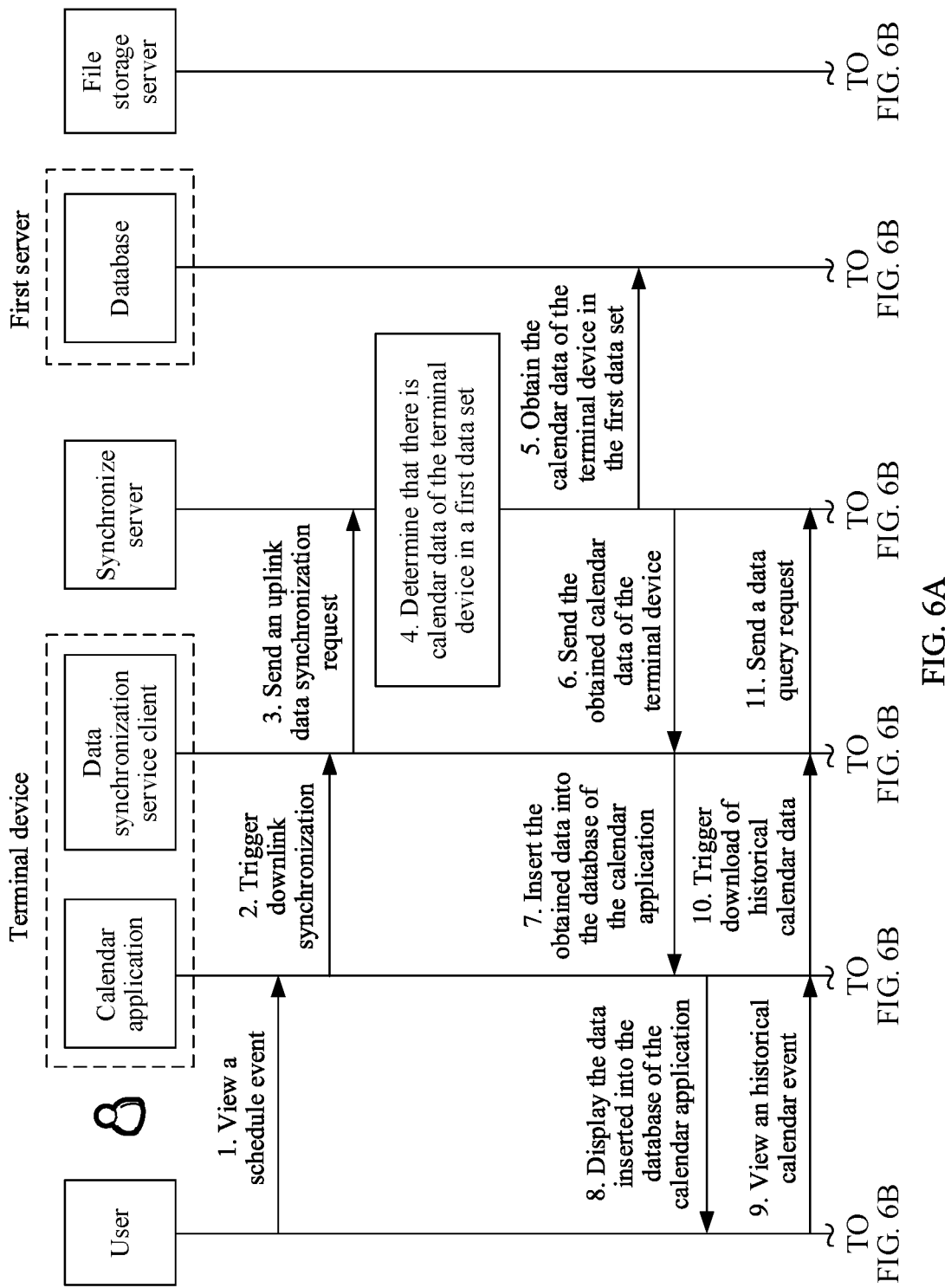
FIG. 6A and FIG. 6B are a schematic flowchart of a downlink data synchronization process according to an embodiment of this application.
Figure 6B:
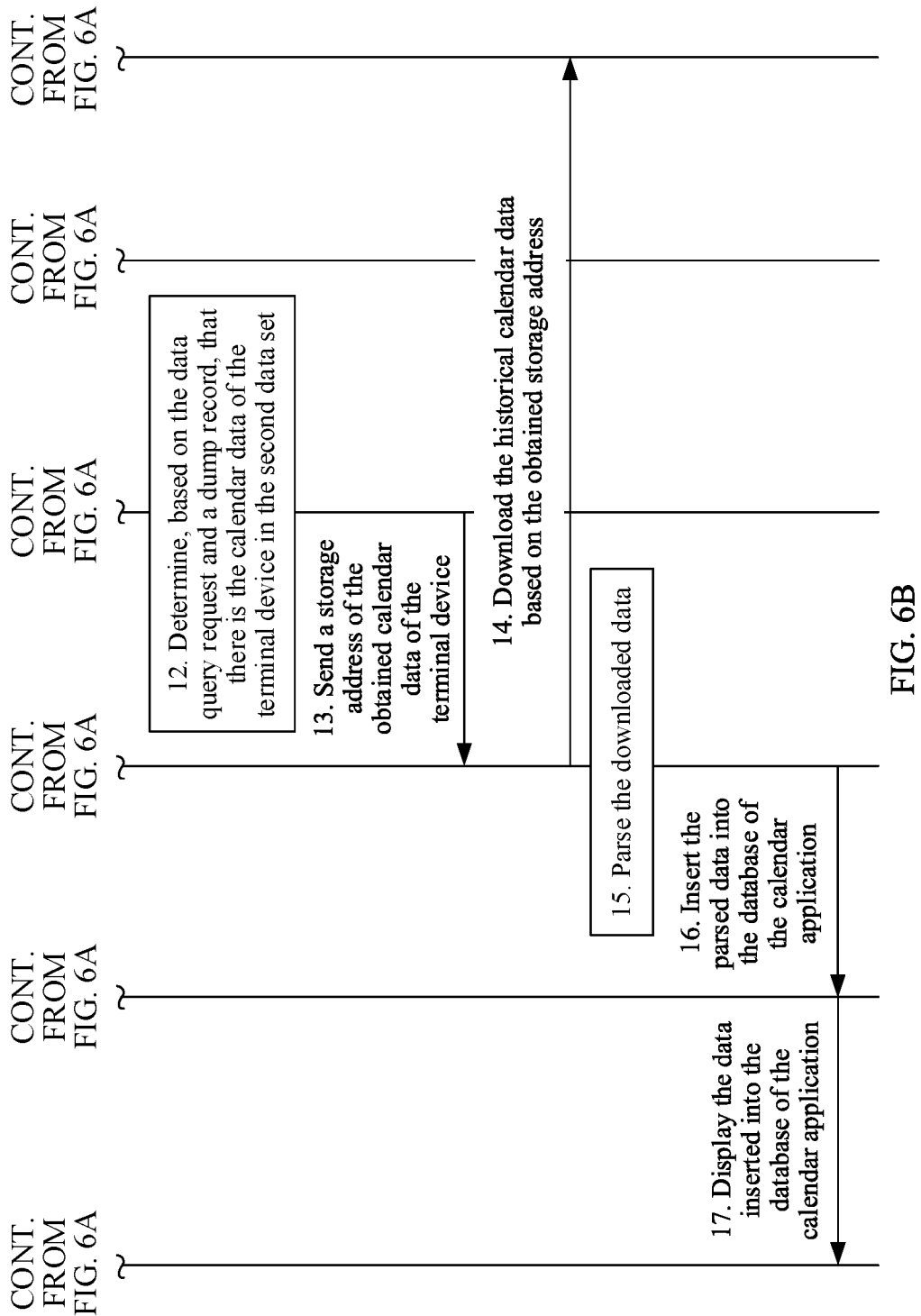

Embodiment 2: On the basis of the foregoing Embodiment 1, when a user views a schedule event in a calendar application of a terminal device, a downlink data synchronization process is triggered. As shown in FIG. 6A and FIG. 6B, the process includes the following steps:

1. A user taps a calendar application in a terminal device, to view a schedule event in a calendar application.

2. The calendar application on the terminal device triggers a data synchronous service client on the terminal device to perform downlink data synchronization.

3. The data synchronization service client on the terminal device sends a downlink data synchronization request to a server. Data requested by the terminal device in the downlink data synchronization request is calendar data.

4. The control server determines, based on the downlink data synchronization request, that there is data corresponding to the calendar data of the terminal device in the first data set.

5. The control server obtains, from the database, the data corresponding to the calendar data of the terminal device.

6. The control server sends the obtained data to the data synchronization service client of the terminal device.

7. The data synchronization service client of the terminal device inserts obtained structured data into the database of the calendar application.

8. The calendar application of the terminal device displays the data obtained from the control server.

9. The user operates the calendar application on the terminal device, to view a historical schedule event.

10. The calendar application on the terminal device triggers the data synchronization service client to download historical calendar data of the terminal device.

11. The data synchronization service client of the terminal device sends a data query request to the control server. Data to be queried by the terminal device in the data query request is the calendar data.

12. The control server determines, based on the data query request and the dump record, that there is the calendar data of the terminal device in the second data set.

13. The control server returns a storage address corresponding to the calendar data of the terminal device in the dump record to the data synchronization service client of the terminal device.

14. The data synchronization service client of the terminal device downloads, from the second data set based on the storage address corresponding to the calendar data of the terminal device, the data corresponding to the calendar data of the terminal device.

15. The data synchronization service client of the terminal device parses the downloaded data.

16. The data synchronization service client of the terminal device inserts parsed schedule event into the database of the calendar application.

17. The calendar application of the terminal device displays the downloaded calendar data to the user.

Figure 7:
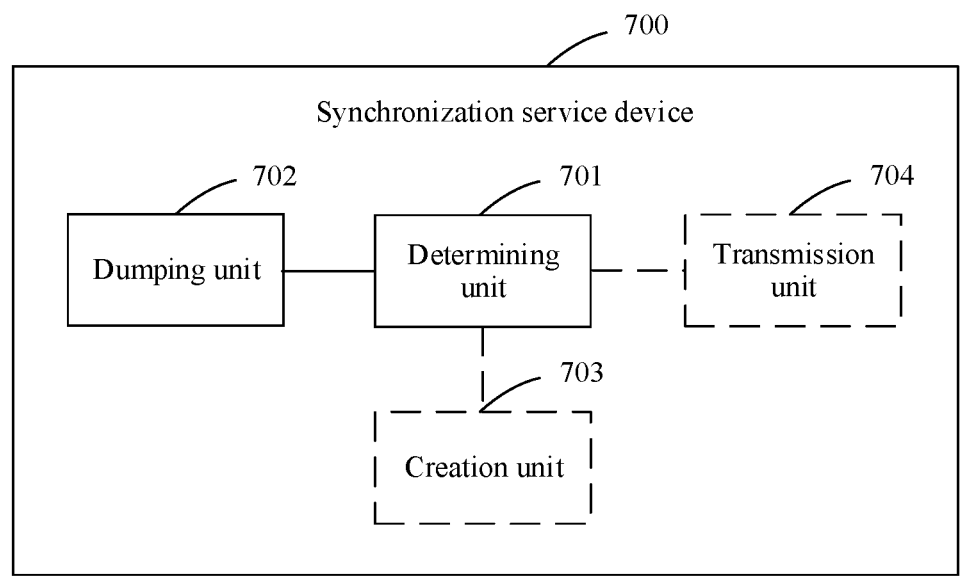
FIG. 7 is a schematic structural diagram of a synchronization service device according to an embodiment of this application.

Based on the foregoing embodiment, an embodiment of this application further provides a synchronization service device. The synchronization service device may implement the data synchronization method shown in FIG. 3. Referring to FIG. 7, the synchronization service device 700 includes a determining unit 701 and a dumping unit 702.

The determining unit 701 is configured to determine that there is target data that meets a specified condition in a first data set on a first server, where the first data set is used to store synchronization data of a terminal device.

The dumping unit 702 is configured to store the target data into a second data set on a second server, and delete the target data from the first data set.

When a downlink data synchronization request sent by the terminal device is received, data in the first data set is used to synchronously update corresponding synchronization data on the terminal device, and data in the second data set is used to not synchronously update corresponding synchronization data on the terminal device.

Optionally, the specified condition is any one or a combination of at least two of the following conditions:

condition 1: Storage duration of the data in the first data set is greater than a specified threshold;

condition 2: A storage time point of the data in the first data set is earlier than a first specified date;

condition 3: Time information included in the data in the first data set is earlier than a second specified date; and condition 4: The data in the first data set is not updated within specified duration.

Optionally, when storing the target data into the second data set, the dumping unit 702 is configured to:

convert the target data into unstructured data, and store the unstructured data obtained through conversion into the second data set.

Optionally, the synchronization service device 700 further includes a creating unit 703, configured to: after the dumping unit 702 stores the target data into the second data set, obtain a storage address of the target data in the second data set; and create and save a dump record for the target data. The dump record includes an identifier of synchronization data of the terminal device corresponding to the target data and the storage address of the target data in the second data set.

Optionally, the synchronization service device 700 further includes a transmission unit 704, configured to receive the downlink data synchronization request sent by the terminal device. The downlink data synchronization request carries the identifier of the synchronization data requested by the terminal device.

The determining unit 701 is further configured to determine, based on the dump record and the identifier of the synchronization data requested by the terminal device, that there is the synchronization data requested by the terminal device in the first data set and the second set.

The transmission unit 704 is further configured to send, to the terminal device, the data requested by the terminal device in the first data set and a storage address corresponding to the synchronization data requested by the terminal device in the dump record.

Optionally, the synchronization service device 700 further includes a transmission unit 704, configured to receive a data query request sent by the terminal device. The data query request carries an identifier of data to be queried by the terminal device.

The determining unit 701 is further configured to determine, based on the dump record and the identifier of the data to be queried by the terminal device, that there is the data to be queried by the terminal device in the second data set.

The transmission unit 704 is further configured to send, to the terminal device, a storage address corresponding to the data to be queried by the terminal device in the dump record.

Optionally, the synchronization service device 700 further includes a transmission unit 704, configured to receive the downlink data synchronization request sent by the terminal device. The downlink data synchronization request carries the identifier of the synchronization data requested by the terminal device.

The determining unit 701 is further configured to determine, based on the identifier of the synchronization data requested by the terminal device, that there is the synchronization data requested by the terminal device in the first set.

The transmission unit 704 is further configured to: obtain, from the first data set, the synchronization data requested by the terminal device, and send the obtained data to the terminal device.

It should be noted that, in this embodiment of this application, unit division is exemplary, and is merely a logical function division. In actual implementation, another division manner may be used. Functional modules in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, technical solutions of this application may be implemented in the form of a software product. The software product is stored in a storage medium and includes a plurality of instructions for instructing a computer device (which may be a personal computer, a server, or a network device) or a processor (processor) to perform all or some of the steps of the methods described in embodiments of this application. The foregoing storage medium includes: any medium that can store program code, such as a USB flash drive, a removable hard disk, a read-only memory (ROM), a random-access memory (RAM), a magnetic disk, or an optical disc.

Figure 8:
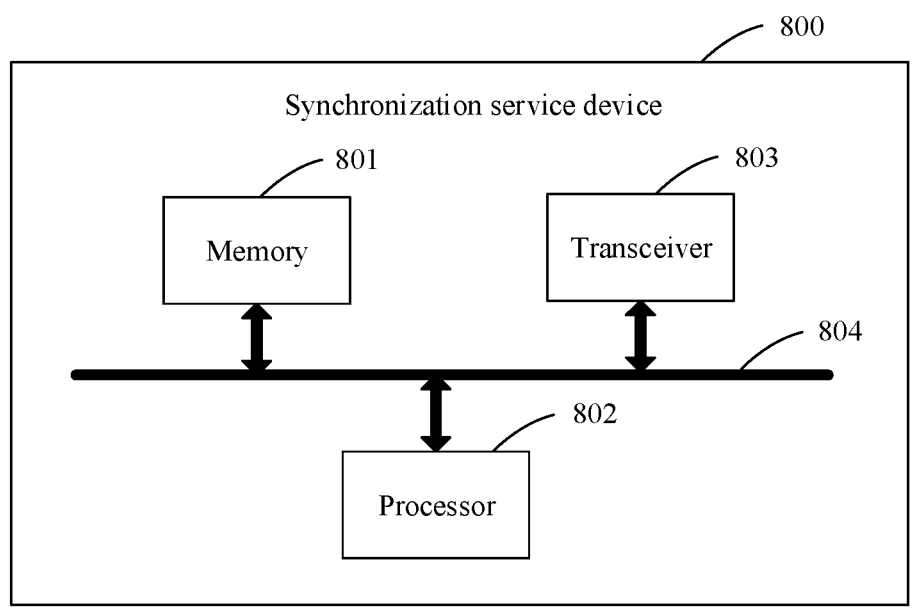
FIG. 8 is a schematic structural diagram of another synchronization service device according to an embodiment of this application.

Based on a same inventive concept, an embodiment of this application further provides a synchronization service device. The synchronization service device is configured to implement the data synchronization method shown in FIG. 3, and has a function of the synchronization service device 700 shown in FIG. 7. Referring to FIG. 8, the synchronization service device 800 includes a memory 801 and a processor 802.

The memory 801 is configured to store a program instruction.

The processor 802 is configured to invoke the program instruction stored in the memory 801, to execute:

determining that there is target data that meets a specified condition in a first data set on a first server, where the first data set is used to store synchronization data of a terminal device; and storing the target data into a second data set on a second server, and deleting the target data from the first data set.

When a downlink data synchronization request sent by the terminal device is received, data in the first data set is used to synchronously update corresponding synchronization data on the terminal device, and data in the second data set is used to not synchronously update corresponding synchronization data on the terminal device.

Optionally, the specified condition is any one or a combination of at least two of the following conditions:

condition 1: Storage duration of the data in the first data set is greater than a specified threshold;

condition 2: A storage time point of the data in the first data set is earlier than a first specified date;

condition 3: Time information included in the data in the first data set is earlier than a second specified date; and condition 4: The data in the first data set is not updated within specified duration.

Optionally, when storing the target data in the second data set on the server, the processor 802 is configured to: convert the target data into unstructured data, and store the unstructured data obtained through conversion into the second data set.

Optionally, after storing the target data into the second data set on the server, the processor 802 is further configured to: obtain a storage address of the target data in the second data set; and create and save a dump record for the target data. The dump record includes an identifier of synchronization data of the terminal device corresponding to the target data and the storage address of the target data in the second data set.

Optionally, the synchronization service device 800 further includes a transceiver 803, configured to receive the downlink data synchronization request sent by the terminal device. The downlink data synchronization request carries an identifier of synchronization data requested by the terminal device.

The processor 802 is further configured to determine, based on the dump record and the identifier of the synchronization data requested by the terminal device, that there is the synchronization data requested by the terminal device in the first data set and the second set.

The transceiver 803 is further configured to send, to the terminal device, the data requested by the terminal device in the first data set and a storage address corresponding to the synchronization data requested by the terminal device in the dump record.

Optionally, the synchronization service device 800 further includes: a transceiver 803, configured to receive a data query request sent by the terminal device. The data query request carries an identifier of data to be queried by the terminal device.

The processor 802 is further configured to: determine, based on the dump record and the identifier of the data to be queried by the terminal device, that there is the data to be queried by the terminal device in the second data set; and obtain, from the dump record, a storage address corresponding to the data to be queried by the terminal device.

The transceiver 803 is further configured to send the storage address obtained by the processor to the terminal device.

Optionally, the synchronization service device 800 further includes a transceiver 803, configured to receive the downlink data synchronization request sent by the terminal device. The downlink data synchronization request carries an identifier of synchronization data requested by the terminal device.

The processor 802 is further configured to: determine, based on the identifier of the synchronization data requested by the terminal device, that there is the synchronization data requested by the terminal device in the first set; and obtain, from the first data set, the synchronization data requested by the terminal device.

The transceiver 803 is further configured to send the obtained data to the terminal device.

Optionally, the memory 801 may include a volatile memory, for example, a random-access memory (RAM). The memory may alternatively include a non-volatile memory, for example, a flash memory, a hard disk drive (HDD), or a solid-state drive (SSD). The memory 801 may further include a combination of the foregoing types of memories.

Optionally, the processor 802 may be a central processing unit (CPU), a network processor (NP), or a combination of a CPU and an NP. The processor 802 may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

Optionally, the processor 802, the memory 801, and the transceiver 803 may be connected to each other by using a bus 804. The bus 804 may be a peripheral component interconnect (PCI) bus, an extended industry standard architecture (EISA) bus, and or the like. The bus may be classified into an address bus, a data bus, a control bus, and the like. For ease of representation, only one thick line is used to represent the bus in FIG. 8, but this does not mean that there is only one bus or only one type of bus.

An embodiment of this application provides a synchronization service device. The synchronization service device can dump, into the second data set, target data that meets a specified condition in a first data set used to store synchronization data of a terminal device, and deletes the target data from the first data set, so that the first data set can continuously store the synchronization data, and does not exceed a specified upper limit of storing the synchronization data, and the terminal device can quickly access the first data set by using the synchronization service device, and can also obtain data (for example, historical data) in the second data set by using the synchronization service device. This improves user experience.

In conclusion, this application provides a data synchronization method and a synchronization service device. In the method, when determining that there is the target data that meets the specified condition in the first data set, the synchronization service device converts the target data into the second data set, and deletes the target data from the first data set. The first data set is used to store the synchronization data of the terminal device. When the downlink data synchronization request sent by the terminal device is received, the data in the first data set is used to synchronously update the corresponding synchronization data on the terminal device, and the data in the second data set is used to not synchronously update the corresponding synchronization data on the terminal device. In other words, in this embodiment of this application, the synchronization service device that provides the data synchronization service can dump, into the second data set, the target data that meets the specified condition in the first data set, so that the data amount of the synchronization data of the terminal device in the first data set can be dynamically reduced, and the first data set can continuously store the synchronization data of the terminal device, and does not exceed the specified upper limit of the storage capacity. In addition, the synchronization service device stores the target data into the second data set, so that the terminal device can quickly obtain the synchronization data in the first data set by using the synchronization service device, and can also obtain the data in the second data set by using the synchronization service device, so that the user can view, by using the terminal device, the historical data that is stored in the second data set for relatively long time or that is not frequently used, and does not need to delete the synchronization data. Compared with the prior art, the method can effectively improve user experience of the data synchronization service.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clear that persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A data synchronization method, comprising:
   determining that there is target data that meets a specified condition in a first data set on a first server, wherein the first data includes synchronization data of a terminal device;
   storing the target data into a second data set on a second server;
   converting the target data into unstructured data;
   storing the unstructured data obtained through conversion into the second data set;
   obtaining a storage address of the target data in the second data set;
   creating and saving a dump record for the target data, wherein the dump record comprises an identifier of the synchronization data of the terminal device corresponding to the target data and the storage address of the target data in the second data set; and
   deleting the target data from the first data set,
   wherein when a downlink data synchronization request sent by the terminal device is received, data in the first data set is used to synchronously update corresponding synchronization data on the terminal device, and data in the second data set is used to not synchronously update corresponding synchronization data on the terminal device.

2. The method according to claim 1, wherein the specified condition includes at least one of:
   condition 1: storage duration of the data in the first data set is greater than a specified threshold;
   condition 2: a storage time point of the data in the first data set is earlier than a first specified date;
   condition 3: time information comprised in the data in the first data set is earlier than a second specified date; and
   condition 4: the data in the first data set is not updated within a specified duration.

3. The method according to claim 1, wherein the method further comprises:
   receiving the downlink data synchronization request sent by the terminal device, wherein the downlink data synchronization request carries an identifier of synchronization data requested by the terminal device;
   determining, based on the dump record and the identifier of the synchronization data requested by the terminal device, that there is the synchronization data requested by the terminal device in the first data set and the second set; and
   sending, to the terminal device, the data requested by the terminal device in the first data set and a storage address corresponding to the synchronization data requested by the terminal device in the dump record.

4. The method according to claim 1, wherein the method further comprises:
   receiving a data query request sent by the terminal device, wherein the data query request carries an identifier of data to be queried by the terminal device;

determining, based on the dump record and the identifier of the data to be queried by the terminal device, that there is the data to be queried by the terminal device in the second data set; and sending, to the terminal device, a storage address corresponding to the data to be queried by the terminal device in the dump record.

5. The method according to claim 1, wherein the method further comprises:

receiving the downlink data synchronization request sent by the terminal device, wherein the downlink data synchronization request carries an identifier of synchronization data requested by the terminal device;

determining, based on the identifier of the synchronization data requested by the terminal device, that there is the synchronization data requested by the terminal device in the first set; and obtaining, from the first data set, the synchronization data requested by the terminal device, and sending the obtained data to the terminal device.

6. A synchronization service device, comprising a memory and a processor, wherein the memory is configured to store computer-executable instructions; and the processor is configured to invoke the computer-executable instructions stored in the memory, to execute:

determining that there is target data that meets a specified condition in a first data set on a first server, wherein the first data set includes synchronization data of a terminal device;

storing the target data into a second data set on a second server;

converting the target data into unstructured data;

storing the unstructured data obtained through conversion into the second data set;

obtaining a storage address of the target data in the second data set;

creating and saving a dump record for the target data, wherein the dump record comprises an identifier of the synchronization data of the terminal device corresponding to the target data and the storage address of the target data in the second data set; and deleting the target data from the first data set, wherein when a downlink data synchronization request sent by the terminal device is received, data in the first data set is used to synchronously update corresponding synchronization data on the terminal device, and data in the second data set is used to not synchronously update corresponding synchronization data on the terminal device.

7. The synchronization service device according to claim 6, wherein the specified condition includes at least one of:

condition 1: storage duration of the data in the first data set is greater than a specified threshold;

condition 2: a storage time point of the data in the first data set is earlier than a first specified date;

condition 3: time information comprised in the data in the first data set is earlier than a second specified date; and condition 4: the data in the first data set is not updated within a specified duration.

8. The synchronization service device according to claim 6, further comprising a transceiver, configured to receive the downlink data synchronization request sent by the terminal device, wherein the downlink data synchronization request carries an identifier of synchronization data requested by the terminal device;

the processor is further configured to determine, based on the dump record and the identifier of the synchronization data requested by the terminal device, that there is the synchronization data requested by the terminal device in the first data set and the second set; and the transceiver is further configured to send, to the terminal device, the data requested by the terminal device in the first data set and a storage address corresponding to the synchronization data requested by the terminal device in the dump record.

9. The synchronization service device according to claim 6, further comprising: a transceiver, configured to receive a data query request sent by the terminal device, wherein the data query request carries an identifier of data to be queried by the terminal device;

the processor is further configured to: determine, based on the dump record and the identifier of the data to be queried by the terminal device, that there is the data to be queried by the terminal device in the second data set; and obtain, from the dump record, a storage address corresponding to the data to be queried by the terminal device; and the transceiver is further configured to send the storage address obtained by the processor to the terminal device.

10. The synchronization service device according to claim 6, further comprising: a transceiver, configured to receive the downlink data synchronization request sent by the terminal device, wherein the downlink data synchronization request carries an identifier of synchronization data requested by the terminal device;

the processor is further configured to: determine, based on the identifier of the synchronization data requested by the terminal device, that there is the synchronization data requested by the terminal device in the first set; and obtain, from the first data set, the synchronization data requested by the terminal device; and the transceiver is further configured to send the obtained data to the terminal device.

11. A non-transitory computer-readable storage medium, having computer-executable instructions stored thereon, the computer-executable instructions, when executed by one or more processor, cause the processor to facilitate:

determining that there is target data that meets a specified condition in a first data set on a first server, wherein the first data set includes synchronization data of a terminal device:

storing the target data into a second data set on a second server;

converting the target data into unstructured data;

storing the unstructured data obtained through conversion into the second data set;

obtaining a storage address of the target data in the second data set;

creating and saving a dump record for the target data, wherein the dump record comprises an identifier of the synchronization data of the terminal device corresponding to the target data and the storage address of the target data in the second data set; and deleting the target data from the first data set, wherein when a downlink data synchronization request sent by the terminal device is received, data in the first data set is used to synchronously update corresponding synchronization data on the terminal device, and data in the second data set is used to not synchronously update corresponding synchronization data on the terminal device.

\* \* \* \* \*